United States Patent
Wegmann et al.

(10) Patent No.: US 10,524,152 B2
(45) Date of Patent: Dec. 31, 2019

(54) COVERAGE HOLE ANALYSIS

(71) Applicant: Nokia Solutions and Networks Oy, Espoo (FI)

(72) Inventors: Bernhard Wegmann, Holzkirchen (DE); Henrik Martikainen, Jyvaskyla (FI); Ingo Viering, Munich (DE); Tero Henttonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/542,132

(22) PCT Filed: Jan. 22, 2015

(86) PCT No.: PCT/EP2015/051185
§ 371 (c)(1),
(2) Date: Jul. 7, 2017

(87) PCT Pub. No.: WO2016/116155
PCT Pub. Date: Jul. 28, 2016

(65) Prior Publication Data
US 2018/0262935 A1 Sep. 13, 2018

(51) Int. Cl.
*H04W 24/10* (2009.01)
*H04W 76/19* (2018.01)
*H04W 24/02* (2009.01)
*H04W 36/14* (2009.01)

(52) U.S. Cl.
CPC ........... *H04W 24/10* (2013.01); *H04W 24/02* (2013.01); *H04W 76/19* (2018.02); *H04W 36/14* (2013.01)

(58) Field of Classification Search
CPC ..... H04W 76/19; H04W 24/02; H04W 24/10; H04W 36/14
See application file for complete search history.

(56) References Cited

U.S. PATENT DOCUMENTS

| | | | |
|---|---|---|---|
| 9,154,978 B2 * | 10/2015 | Chou | H04W 4/70 |
| 2009/0284284 A1 * | 11/2009 | Shionoiri | G11C 7/062 327/52 |
| 2010/0190499 A1 * | 7/2010 | Wu | H04W 36/0066 455/436 |
| 2010/0311342 A1 * | 12/2010 | Arbel | H04H 60/43 455/62 |
| 2012/0015606 A1 * | 1/2012 | Beacham | H04B 7/18506 455/62 |

(Continued)

OTHER PUBLICATIONS

3GPP TSG-RAN WG3 #75, Feb. 6-10, 2012, Dresden, Germany, R3-120100, "Radio Link Failure Root Cause Analysis", Fujitsu, 4 pgs.

(Continued)

*Primary Examiner* — Chi Ho A Lee
(74) *Attorney, Agent, or Firm* — Harrington & Smith (57) ABSTRACT

There are provided measures for improvement of coverage hole analysis. Such measures exemplarily include detecting a radio link failure, producing a failure report including information indicative of a radio condition during a time period between said radio link failure and a successful establishment of a radio link, detecting said successful establishment of said radio link, and transmitting, after detection of said successful establishment of said radio link, said failure report.

20 Claims, 8 Drawing Sheets

(56) References Cited

U.S. PATENT DOCUMENTS

| | | | | |
|---|---|---|---|---|
| 2012/0113804 A1* | 5/2012 | Zhang | ................ | H04L 12/2878 |
| | | | | 370/228 |
| 2012/0254924 A1* | 10/2012 | Freundlich | ............... | C12Q 1/37 |
| | | | | 725/81 |
| 2013/0189973 A1* | 7/2013 | Chang | ................ | H04W 24/04 |
| | | | | 455/423 |
| 2014/0036656 A1* | 2/2014 | Chou | ..................... | H04W 4/70 |
| | | | | 370/216 |
| 2014/0313920 A1* | 10/2014 | Chai | ................... | H04W 24/10 |
| | | | | 370/252 |
| 2015/0373772 A1* | 12/2015 | Watanabe | ............ | H04W 76/19 |
| | | | | 455/436 |
| 2016/0014839 A1* | 1/2016 | Liu | ..................... | H04W 76/18 |
| | | | | 370/329 |
| 2016/0242049 A1* | 8/2016 | Centonza | ............. | H04W 24/02 |
| 2017/0171788 A1* | 6/2017 | Won | ..................... | H04W 36/08 |

OTHER PUBLICATIONS

3GPP TSG-RAN WG4 Meeting #AH-04, Xi'an, China, Oct. 11-15, 2010, R4-103832, "Overview of Requirements for Minimization of Drive Tests", Ericsson, ST-Ericsson, 4 pgs.

3GPP TSG SA WG5 (Telecom Management) Meeting #89, May 27-31, 2013, Sophia Antipolis (France), S5-131078, "Analysis of CCO Data Correlation and Capacity Optimisation (560032)", Nokia Siemens Networks, 16 pgs.

3GPP TSG SA WG5 (Telecom Management) Meeting #91, Oct. 14-21, 2013, Shenzhen, China, S5-131663, "Add LTE Coverage Hole Detection Use Case", Huawei, Ericsson, 2 pgs.

* cited by examiner

COVERAGE HOLE ANALYSIS

FIELD

The present invention relates to improvement of coverage hole analysis. More specifically, the present invention exemplarily relates to measures (including methods, apparatuses and computer program products) for realizing improvement of coverage hole analysis.

BACKGROUND

The present specification generally relates to mobile radio communications with focus on Self-optimizing Networks (SON) and in particular to Coverage and Capacity Optimization (CCO) use case and mechanisms.

Coverage holes are one of network issues causing Radio Link Failures (RLF) and call drops, and CCO is the SON use case to cope with these issues.

In mobile radio communications, different types of coverage holes exist. There are concepts of RLF reporting and analysis which provide means to identify coverage holes and separate them from mobility related failures.

However, in order to allow an efficient CCO algorithm, a more detailed analysis of the root cause of a coverage hole than with the above mentioned concepts is needed. Namely, only with detailed knowledge regarding a root cause of a coverage hole, the appropriate countermeasures might be determined.

Figure 6:
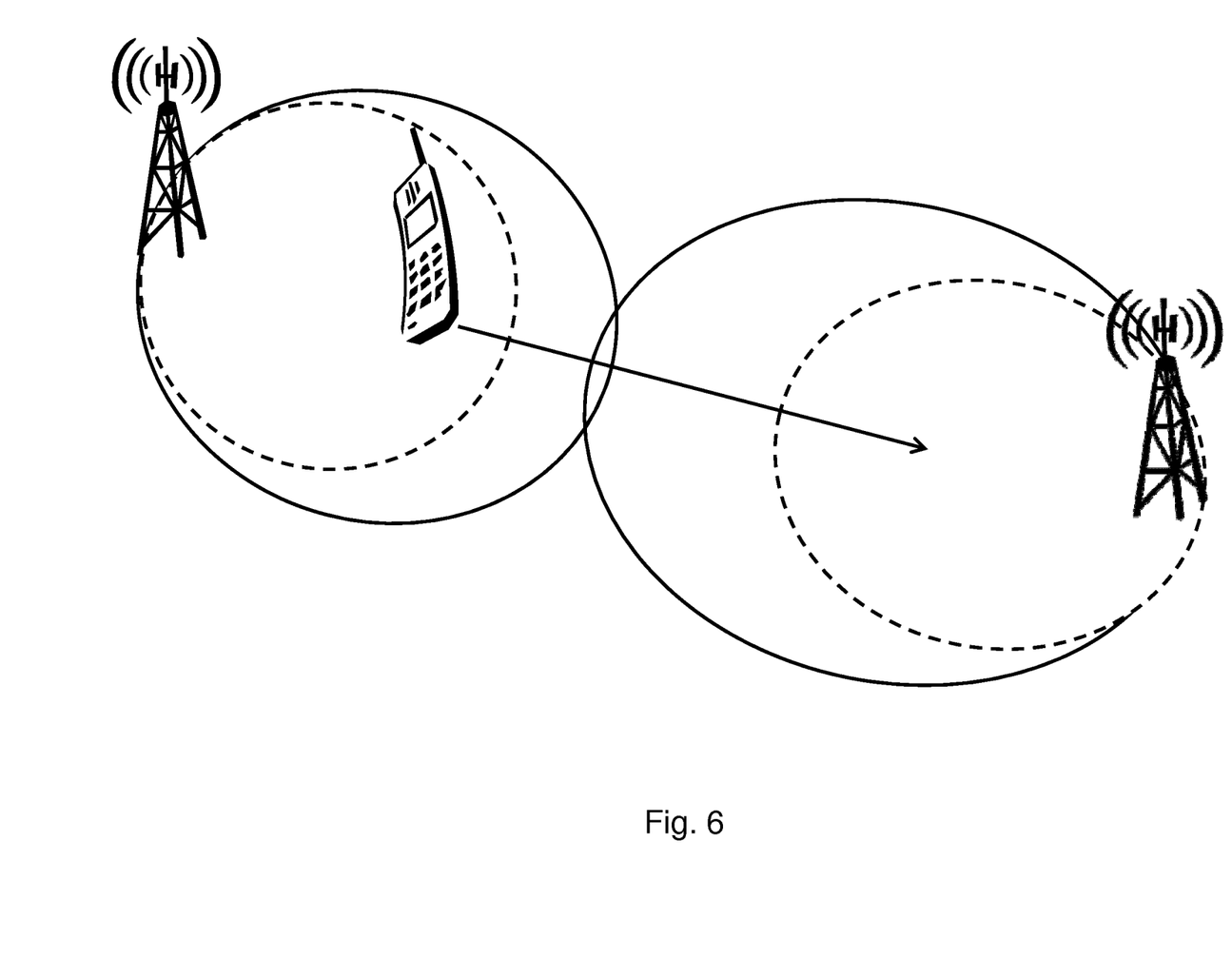
FIG. 6 shows a schematic diagram illustrating an exemplary coverage hole.

Here, coverage holes with unbalanced uplink (UL) and downlink (DL) require particular consideration. FIG. 6 illustrates such coverage holes (in particular an UL coverage hole) with unbalanced UL and DL. In particular, according to FIG. 6, DL coverages of two cells are indicated by solid lines, while UL coverages of these two cells are indicated by dotted lines. As can be seen, in such possible scenario, a mobile device might be inside a DL coverage area of a cell while the same mobile device is outside the UL coverage area of that cell, i.e., in a coverage hole.

Often when mobile terminals are in a coverage hole situation, the UL connection is lost while DL connection is still good. When such a terminal experiences a RLF, the terminal tries to re-establish or re-connect to the network since the received DL signal still indicates good coverage. But both re-establishment and re-connection will fail since the UL is not working. Later, when also UL connection becomes stable again, the terminal is able to re-connect, and a RLF report sent by the terminal can be analysed at the network.

According to existing concepts, an RLF report represents the situation at the moment the RLF occurred.

According to a further concept, a Connection Establishment Failure (CEF) report contains information regarding the last failed connection setup.

According to a further concept, Minimization of Drive Tests (MDT) idle mode logging is specified. Here, the network can instruct the UEs to log measurements even when they are not in connected mode.

Considering the outlined known concepts, rather sparse information related to an occurred coverage hole is available, such that the problem arises that relevant information beneficial for coverage hole analysis and detection is not provided to the network.

Hence, there is a need to provide for improvement of coverage hole analysis.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method, comprising detecting a radio link failure, producing a failure report including information indicative of a radio condition during a time period between said radio link failure and a successful establishment of a radio link, detecting said successful establishment of said radio link, and transmitting, after detection of said successful establishment of said radio link, said failure report.

According to an exemplary aspect of the present invention, there is provided a method, comprising receiving a failure report including information indicative of a radio condition during a time period between a radio link failure and a successful establishment of a radio link, and performing a coverage hole analysis on the basis of said information.

According to an exemplary aspect of the present invention, there is provided an apparatus, comprising at least one processor and at least one memory including computer program code, wherein the at least one memory and computer program code are configured, with the at least one processor, to cause the apparatus to perform operations comprising at least detecting a radio link failure; producing a failure report including information indicative of a radio condition during a time period between said radio link failure and a successful establishment of a radio link; detecting said successful establishment of said radio link, and transmitting, after detection of said successful establishment of said radio link, said failure report.

According to an exemplary aspect of the present invention, there is provided an apparatus, comprising detecting means configured to detect a radio link failure, producing means configured to produce a failure report including information indicative of a radio condition during a time period between said radio link failure and a successful establishment of a radio link, wherein said detecting means is further configured to detect said successful establishment of said radio link, and said apparatus further comprising transmitting means configured to transmit, after detection of said successful establishment of said radio link, said failure report.

According to an exemplary aspect of the present invention, there is provided an apparatus, comprising at least one processor and at least one memory including computer program code, wherein the at least one memory and computer program code are configured, with the at least one processor, to cause the apparatus to perform operations comprising at least receiving a failure report including information indicative of a radio condition during a time period between a radio link failure and a successful establishment of a radio link, and performing a coverage hole analysis on the basis of said information.

According to an exemplary aspect of the present invention, there is provided an apparatus, comprising receiving means configured to receive a failure report including information indicative of a radio condition during a time period between a radio link failure and a successful establishment of a radio link, and performing means configured to perform a coverage hole analysis on the basis of said information.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient obtaining of information beneficial for coverage hole analysis and detection to thereby solve at least part of the problems and drawbacks identified in relation to the prior art.

In particular, compared to the MDT idle mode logging, exemplary embodiments of the present invention have several advantages solving at least part of the prior art's problems. Namely, DL availability is stored for every RLF/HOF occasion being used for coverage hole analysis, and no additional overhead is caused for all idle mode UEs but only for those experiencing RLF before going to idle mode. Furthermore, fewer resources are needed for storing and reporting DL availability, and no privacy issues are identified, which are often raised for MDT.

Furthermore, compared to LTE Release 11 RLF and CEF reports, according to exemplary embodiments of the present invention, information about DL availability is provided in much more cases.

By way of exemplary embodiments of the present invention, there is provided improvement of coverage hole analysis. More specifically, by way of exemplary embodiments of the present invention, there are provided measures and mechanisms for realizing improvement of coverage hole analysis.

Thus, improvement is achieved by methods, apparatuses and computer program products enabling/realizing improvement of coverage hole analysis.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound coverage holes may happen for mobile devices such as terminals.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) improvement of coverage hole analysis.

From the measurements which may be included in the above mentioned RLF report, the downlink signal quality at the moment the RLF occurred might be be checked. Further, from an rlf-cause (available since Release 11 of $3^{rd}$ Generation Partnership Project (3GPP) Long Term Evolution (LTE)), it might be be identified whether the RLF was because UL transmission failed.

However, after the RLF, several different actions may be carried out like re-establishment or re-connection attempts with different results. During this phase the UE has information e.g. about DL signal strength but it is not recorded in the RLF report, even though the information might be beneficial later on network-side for detailed coverage hole analysis.

Here, re-establishment is a procedure after an RLF/Handover Failure (HOF) where a terminal is able to return to a cell which has the user equipment (UE) context of that particular UE (terminal), e.g. previous cell within few seconds of failure. Re-establishment is fast without the complete authentication/authorization process since UE context is known.

In more detail, after detection of an RLF the UE starts the re-establishment phase where a fast re-connection without renewal of authentication/authorization process provided that the attempted cell has got the UE context already. In this re-establishment phase, the UE is no longer connected to any cell but is also not yet in RRC_IDLE. Within this phase, the UE first selects a cell with sufficient downlink signal quality and sends an RRCConnectionReestablishmentRequest message after having synchronized with this cell. Re-establishment is successful, if the selected cell has got the UE context information. Re-establishment fails, if cell selection could not be accomplished within time interval T310 or if UL connectivity fails or if selected cell has not been prepared, i.e. does not have got UE context information.

If re-establishment is not successful the terminal will go to RRC_IDLE mode and will try connection establishment, i.e., will try to re-connect.

Re-connection is a term used to indicate that terminal was previously connected and wants to connect again. This procedure is also called RRC connection establishment which is the same regardless whether UE is new or has just experienced an RLF. Re-connection starts from RRC_IDLE requiring the complete security/authentication procedure.

Re-establishment procedure is hence faster and possibly more transparent to higher layers. Re-establishment is done to the cell where terminal experienced the RLF, re-connection can be tried to other cell too.

From LTE (e.g. Releases 9, 10), a RLF report is known. For example, an RLF report according to LTE Release 10 contains several cell IDs, namely FailedCellID (cell where RLF occurred), ReestablishmentCellID (cell where UE tried to reestablish), and PreviousPCellID (cell where the last successful Handover (HO) was initiated). Hence, in general, the RLF report may have information regarding the initial failure before the coverage hole and regarding whether and where a re-establishment was attempted. From LTE Release 11, the above mentioned rlf-cause field is known which is indicative of whether the RLF happened due to T310 (certain LTE timer) expiry, a random access problem, or maximum number of RLC retransmissions has been reached. However, RLF report does not contain any information regarding the radio conditions the terminal (e.g. UE) experiences after the failed connection re-establishment. The RLF report may be retrieved by the network side evolved NodeB (eNB) much later, as the UE is required to store the report for at least 48 hours.

The existence of the above mentioned CEF report may indicate to the network that the received UE downlink signal was available during the time of failed connection establishment, since without receiving some cell information via broadcast messages the terminal would not even try to setup connection. The information in the CEF report can be used further to analyse why the connection establishment was not successful. However, since the terminal overwrites CEF report fields in the case of new connection establishment failure, there is neither information regarding what happened before the latest failed connection establishment nor regarding how often the UE tried to (unsuccessfully) setup the connection.

Even when these two concepts are considered together, the RLF and CEF reports do not contain information about the downlink channel availability between the RLF and last CEF. If both reports have been logged at times close to each other (e.g. within seconds), it may be possible to estimate whether the problem was due to uplink or downlink. However, with longer time within a coverage hole it is typically not possible to have a reliable estimate of the root cause of the problem.

Figure 7:
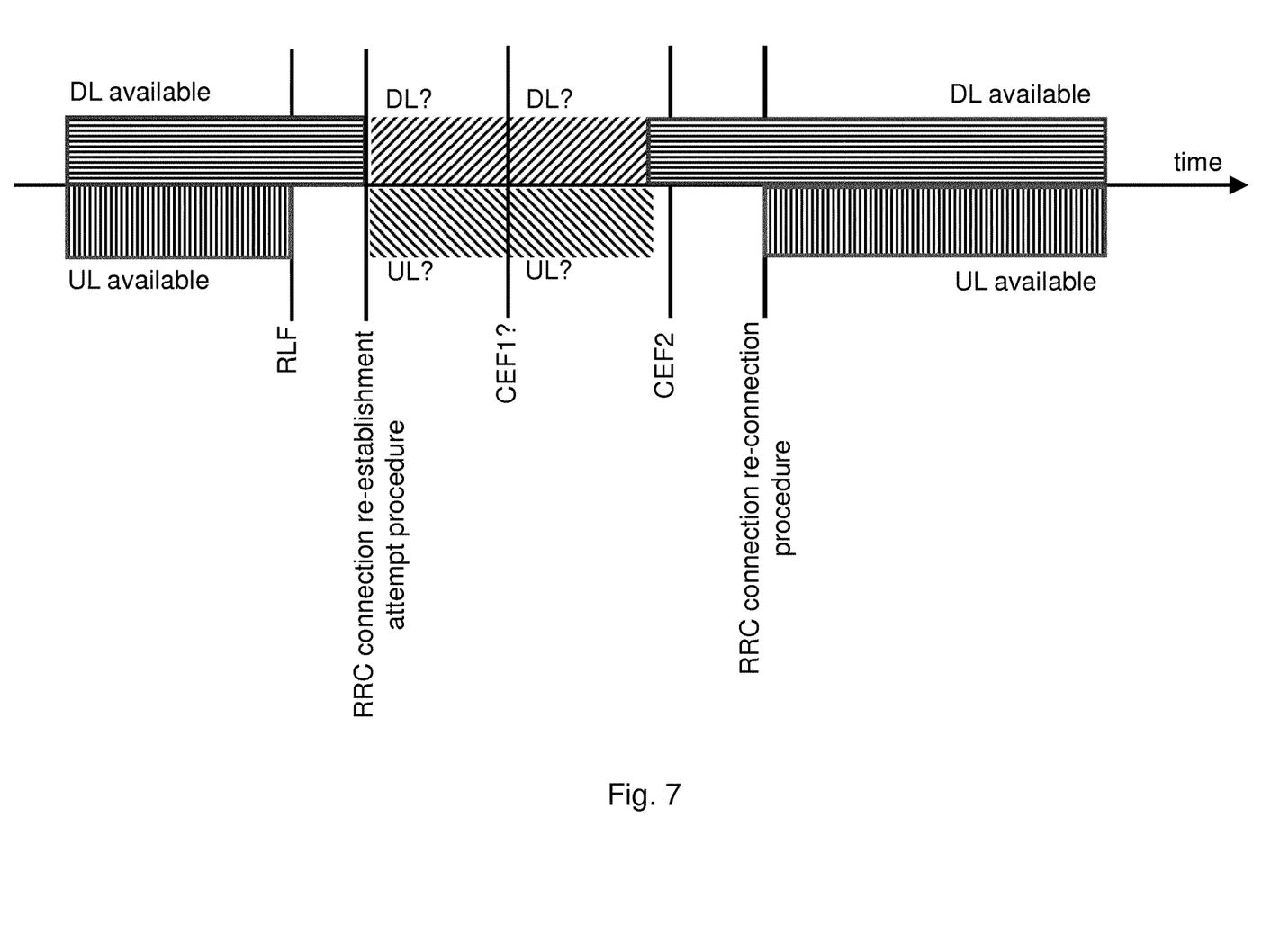
FIG. 7 shows a schematic diagram illustrating an exemplary failure report unclarity.

FIG. 7 illustrates an example case where the information provided by RLF and CEF reports is not sufficient to indicate whether the coverage hole was due to downlink, uplink or both failing, and in particular illustrates an RLF and CEF report unclarity. In this example, UL connectivity is lost first. Since DL connectivity is still present, UE tries re-establishment but it fails in this example. From CEF report it can be derived that DL was available at the time of CEF2. However, since CEF report information is overwritten in the case of a new CEF, it can not be derived whether CEF1 ever happened. In such case, at the terminal, information as to whether downlink was available at the time of CEF1 would exist.

Both the RLF and CEF reports may contain some timing information (i.e. a timeSinceFailure-r11 field known from LTE), indicating when the failure occurred. Accordingly, although it can be known whether the time difference between RLF and CEF is long (e.g. at least several seconds), it can not be known what happened in between.

Furthermore, if an idle mode measurement interval of the above mentioned (MDT) idle mode logging is short enough it might be used in coverage hole classification and analysis. However, several drawbacks in MDT idle mode logging are identified.

Namely, due to the nature of the RLFs (unexpected occurrence), the idle mode logging cannot be enabled just before RLF. Consequently, if idle mode logging is started as a precautionary measure, it will cause significant overhead for many UEs and it is not granted when the problem will happen again. Although, such idle mode logging might be started only in cells where long coverage holes have occurred, such approach is not able to catch the already occurred events but only those occurring in the future. Just to be complete, MDT logging is restricted to Reference Signal Received Power (RSRP) and Reference Signal Received Quality (RSRQ) measurements only.

According to exemplary embodiments of the present invention, an enhanced failure analysis for coverage analysis based on existing failure report concepts like Radio Link Failure (RLF) report, connection failure establishment (CEF) report, measurement reports, etc., is provided, and a DL availability scheme is proposed.

In particular, according to exemplary embodiments of the present invention, in general a field may be added to the RLF report which provides additional information about downlink availability. The field may contain e.g. the values "downlink always available", "downlink disappeared", "downlink unclear" (or other and/or more). Additionally, according to further exemplary embodiments of the present invention, in general a field may be added to the CEF report to indicate the number of CEF reports that the UE has experienced since the last reporting of a CEF report.

Figure 1:
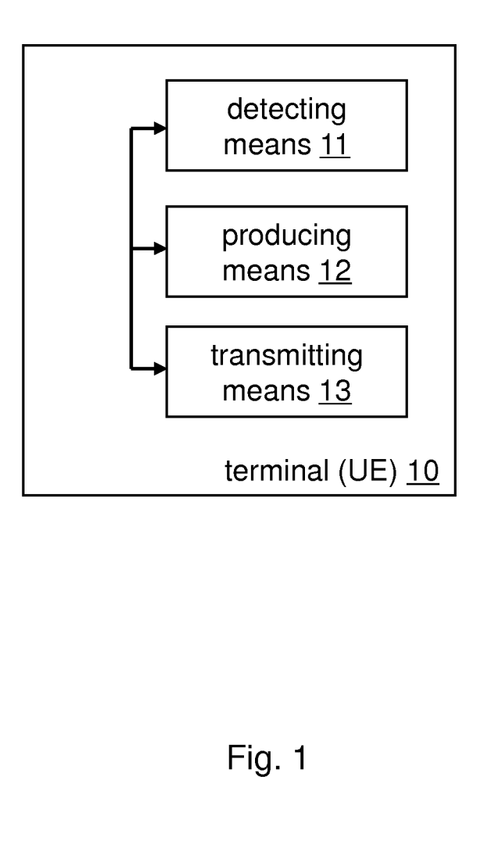
FIG. 1 is a block diagram illustrating an apparatus according to exemplary embodiments of the present invention.
Figure 4:
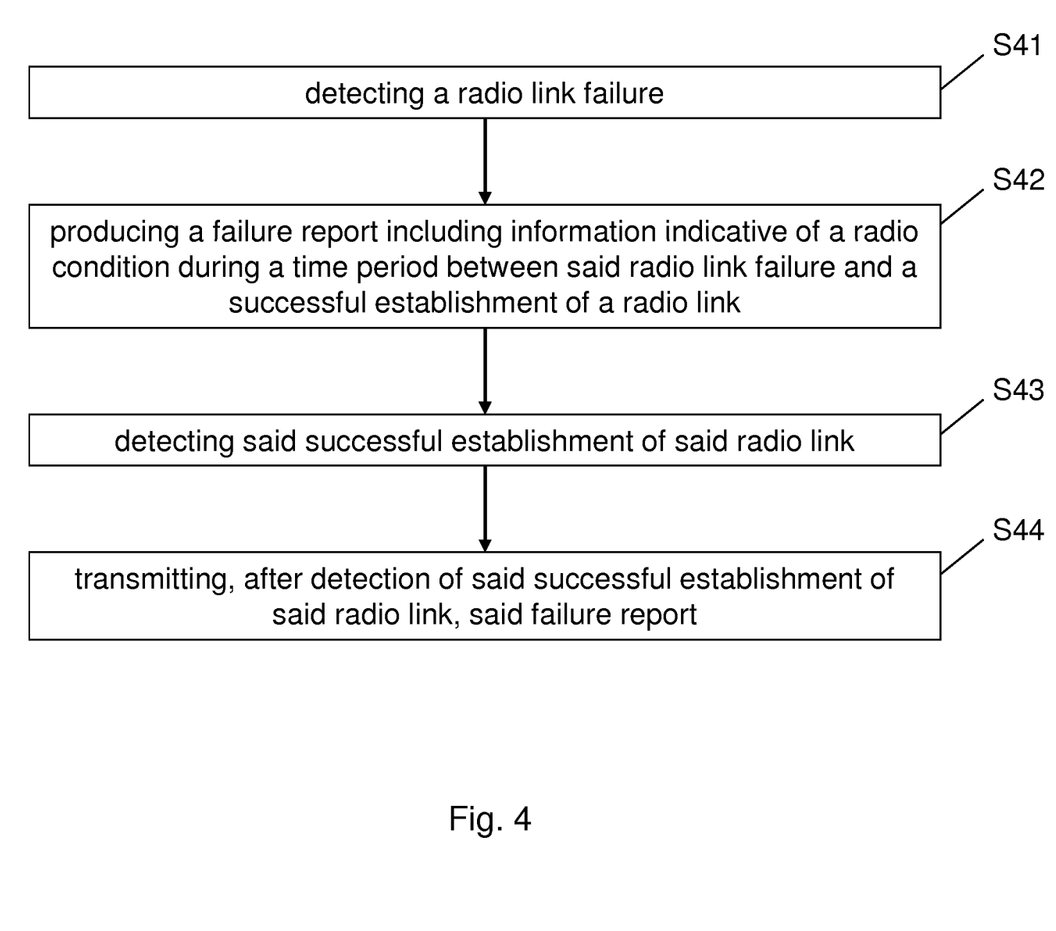
FIG. 4 is a schematic diagram of a procedure according to exemplary embodiments of the present invention.

FIG. 1 is a block diagram illustrating an apparatus according to exemplary embodiments of the present invention. The apparatus may be a terminal 10 such as a UE comprising a detecting means 11, a producing means 12 and a transmitting means 13. The detecting means 11 detects a radio link failure. The producing means 12 produces a failure report including information indicative of a radio condition during a time period between said radio link failure and a successful establishment of a radio link (i.e., completed re-establishment, re-connection, new RRC connection). The detecting means 11 further detects said successful establishment of said radio link. The transmitting means 13 transmits, after detection of said successful establishment of said radio link, said failure report. FIG. 4 is a schematic diagram of a procedure according to exemplary embodiments of the present invention. The apparatus according to FIG. 1 may perform the method of FIG. 4 but is not limited to this method. The method of FIG. 4 may be performed by the apparatus of FIG. 1 but is not limited to being performed by this apparatus.

As shown in FIG. 4, a procedure according to exemplary embodiments of the present invention comprises an operation of detecting (S41) a radio link failure, an operation of producing (S42) a failure report including information indicative of a radio condition during a time period between said radio link failure and a successful establishment of a radio link, an operation of detecting (S43) said successful establishment of said radio link, and an operation of transmitting (S44), after detection of said successful establishment of said radio link, said failure report.

Figure 2:
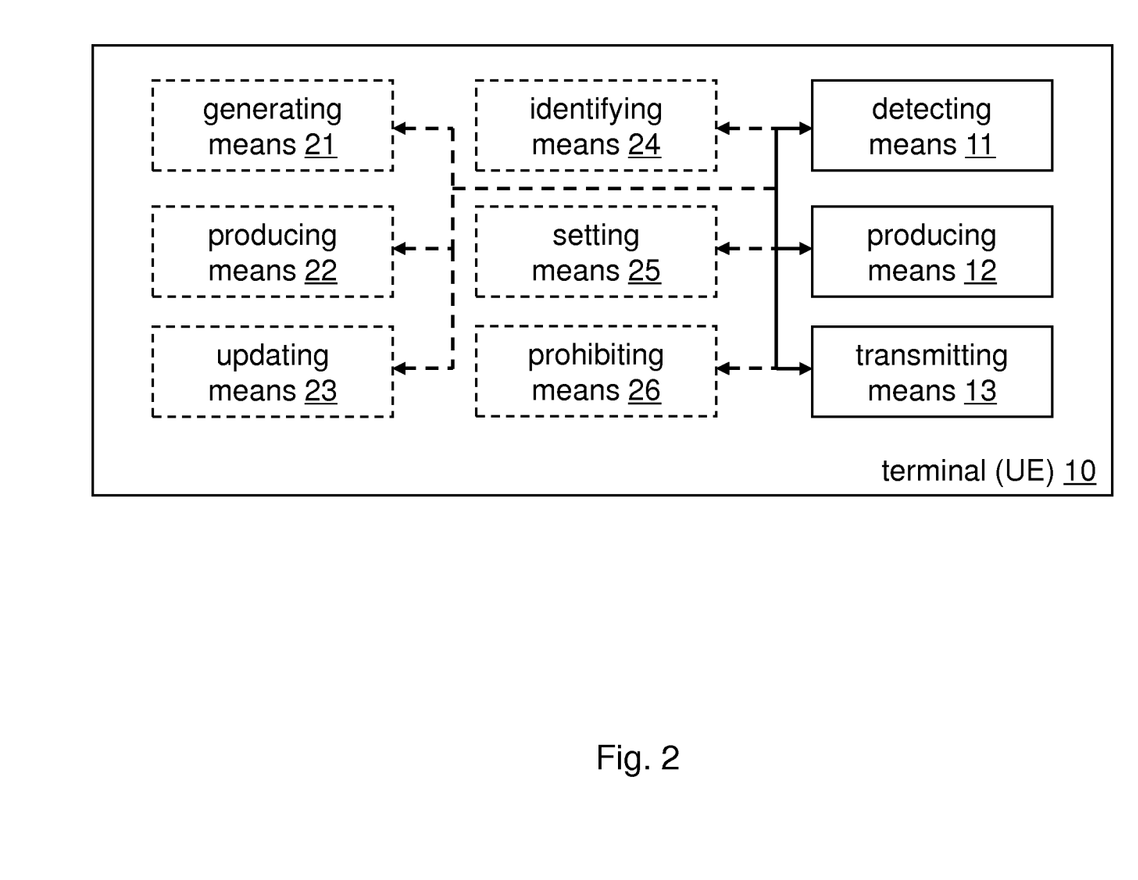
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise generating means 21, producing means 22, updating means 23, identifying means 24, setting means 25, and/or prohibiting means 26.

According to a variation of the procedure shown in FIG. 4, exemplary details of the producing operation are given, which are inherently independent from each other as such.

Such exemplary producing operation according to exemplary embodiments of the present invention may comprise an operation of generating, upon detection of said radio link failure, a radio link failure report as said failure report including downlink availability information, an operation of monitoring availability of a downlink during the time period between said radio link failure and said successful establishment of said radio link, and an operation of updating, upon change in said availability of said downlink, said downlink availability information of said radio link failure report.

In other words, according to exemplary embodiments of the present invention, a "Downlink quality" field may be used in an RLF report.

According to exemplary embodiments of the present invention, said downlink availability information is indicative of at least one of that said downlink was always available, that said downlink disappeared, and that said availability of said downlink was undetermined.

According to a variation of the procedure shown in FIG. 4, exemplary details of the detecting operation and the generating operation are given, which are inherently independent from each other as such.

Such exemplary detecting operation according to exemplary embodiments of the present invention may comprise an operation of identifying a cause of said radio link failure.

Further, such exemplary generating operation according to exemplary embodiments of the present invention may comprise an operation of setting said downlink availability information to indicate that said downlink was always available, if said cause of said radio link failure is a reached maximum number of radio link control retransmissions, and an operation of setting said downlink availability information to indicate that said downlink was always available, if said cause of said radio link failure is a reached maximum number of random access transmissions, an operation of setting said downlink availability information to indicate that said downlink disappeared, if said cause of said radio link failure is an expiry of a certain timer, and operation of setting said downlink availability information to indicate that said downlink disappeared, if said cause of said radio link failure is any downlink failure, and an operation of setting said downlink availability information to indicate that said downlink was always available, if said cause of said radio link failure is any uplink failure.

According to further exemplary embodiments of the present invention, said certain timer is a Long-Term-Evolution T310 timer.

In other words, according to exemplary embodiments of the present invention, when an RLF (with a root cause of "maximum number of RLC retransmission reached" or "maximum number of RA transmission reached") is detected and the subsequent RLF report is created, the UE sets the field to "downlink always available". If RLF occurs due to T310 expiry (and an RLF report is currently being stored) which includes very weak signal strength measurements, the field is set to "downlink disappeared".

According to a variation of the procedure shown in FIG. 4, exemplary details of the updating operation are given, which are inherently independent from each other as such.

Such exemplary updating operation according to exemplary embodiments of the present invention may comprise an operation of setting said downlink availability information by replacing said downlink availability information, or an operation of setting said downlink availability information by appending a further entry to said downlink availability information, thereby forming a plurality of entries indicating changes in said downlink availability during the time period between said radio link failure and said successful establishment of said radio link.

According to a variation of the procedure shown in FIG. 4, exemplary details of the updating operation are given, which are inherently independent from each other as such.

Such exemplary updating operation according to exemplary embodiments of the present invention may comprise an operation of setting said downlink availability information to indicate that said availability of said downlink was undetermined, if an intensity of said monitoring in said monitoring step is reduced, and an operation of setting said downlink availability information to indicate that said downlink disappeared, if it is discovered in said monitoring step that said downlink disappeared.

In other words, according to exemplary embodiments of the present invention, when the terminal, for example, gives up the connection establishment attempts, it changes the field to "downlink unclear" (undetermined). This flag may be used whenever the terminal becomes less active with the downlink measurements, resulting in that there is a change that downlink disappearance is not noticed.

Further, according to exemplary embodiments, when the terminal recognizes (e.g.) during idle mode that the downlink disappears, it may change the value of the field in RLF report (if existing) to "downlink disappeared". Here, it is noted that when terminal tries to listen for DL broadcast messages during idle mode but is not able to receive any, then the terminal knows (can imply) that DL is not available. Also, if terminal stops connection setups due to DL disappearing then the "downlink disappeared" flag will be set.

According to still further exemplary embodiments of the present invention according to a variation of the procedure shown in FIG. 4, said radio link failure may be happened in a first cell. In such case, exemplary additional operations are given, which are inherently independent from each other as such. According to such variation, an exemplary method according to exemplary embodiments of the present invention may comprise an operation of prohibiting updating said downlink availability information, if said radio link is established to a second cell different from said first cell.

In other words, if the field in an existing RLF report has been set to "downlink always available" and the UE finds a suitable cell other than the RLF cell, the field shall not be touched any longer (i.e. the UE has left the situation which lead to the RLF and therefore will not change it depending on the radio conditions). Alternatively, the UE may also log (e.g. append) an indicator that indicates a successful reselection happened after the RLF.

According to still further exemplary embodiments of the present invention, the failure report is cell-specific.

According to a variation of the procedure shown in FIG. 4, exemplary additional operations are given, which are inherently independent from each other. According to such variation, an exemplary method according to exemplary embodiments of the present invention may comprise an operation of enabling, upon detection of said radio link failure, logging an indication of a time and/or a location of generating said radio link failure report and/or of updating said downlink availability information, and an operation of including a result of said logging into said failure report.

In other words, the failure report may include time/location stamps indicating, e.g., when/where the RLF occurred, when/where the downlink disappeared, etc.

The behavior according to these exemplary embodiments is comparable to idle mode logging activated after detection of the RLF. In particular, a terminal arranged according to the discussed procedure may be configured such that an UL RLF triggers idle mode logging.

Such additional information collected during the idle mode logging might provide extra benefits in certain cases.

As mentioned above, the updating operation may also be implemented by appending a further entry to said downlink availability information. In other words, as an alternative to changing the value of the field as indicated above, the UE may also log the DL quality as a time series of values, i.e. multiple values in the order in which they occur (e.g. idle mode logging).

Here, for example, first the UE detects RLF due to RLC retransmissions and may log "downlink always available" at first. After that, UE attempts to do a re-establishment and several connection establishments which all fail while the downlink is still available. When the UE starts to measure the network less frequently (for example in power saving mode) it may log that the DL status subsequently changed to "downlink unclear". Later in this exemplary scenario, when the UE successfully re-connects to the cell, the UE may stop logging the DL quality (as above) but may also indicate that reselection was successful.

According to a variation of the procedure shown in FIG. 4, exemplary details of the producing operation and exemplary additional operations are given, which are inherently independent from each other as such.

According to such variation, an exemplary method according to exemplary embodiments of the present invention may further comprise an operation of detecting a connection establishment failure.

Such exemplary producing operation according to exemplary embodiments of the present invention may comprise an operation of generating, upon detection of said connection establishment failure, a connection establishment failure report as said failure report including a number of not reported connection establishment failures detected in a lapsed predetermined period of time.

In other words, according to exemplary embodiments of the present invention, a "Number of connection failures" field may be used in a CEF report.

In doing so, the UE may count the number of CEFs that it has experienced within e.g. the last 48 hours and has not reported to the network.

When a CEF occurs, the UE may include in the CEF report the amount of CEFs it has not yet reported to the network.

Figure 3:
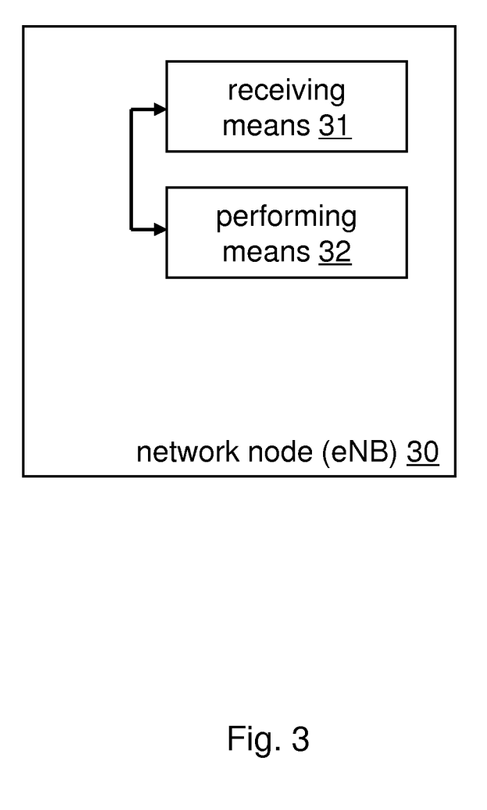
FIG. 3 is a block diagram illustrating an apparatus according to exemplary embodiments of the present invention.

FIG. 3 is a block diagram illustrating an apparatus according to exemplary embodiments of the present invention. The apparatus may be a network node 30 such as an eNB comprising a receiving means 31 and a performing means 32. The receiving means 31 receives a failure report including information indicative of a radio condition during a time period between a radio link failure and a successful establishment of a radio link. The performing means 32 performs a coverage hole analysis on the basis of said information.

Figure 5:
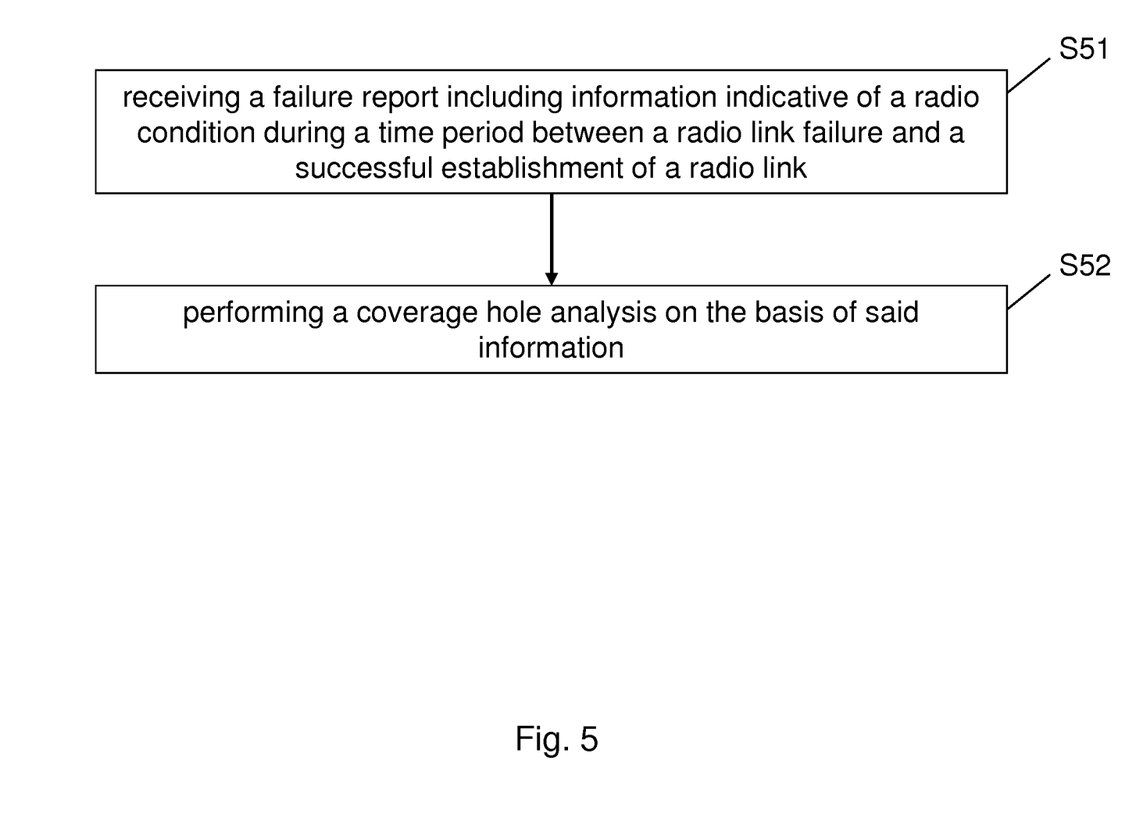
FIG. 5 is a schematic diagram of a procedure according to exemplary embodiments of the present invention.

FIG. 5 is a schematic diagram of a procedure according to exemplary embodiments of the present invention. The apparatus according to FIG. 3 may perform the method of FIG. 5 but is not limited to this method. The method of FIG. 5 may be performed by the apparatus of FIG. 3 but is not limited to being performed by this apparatus.

In an embodiment at least some of the functionalities of the apparatus shown in FIG. 5 may be shared between two physically separate devices forming one operational entity. Therefore, the apparatus may be seen to depict the operational entity comprising one or more physically separate devices for executing at least some of the described processes. Such shared architecture, may comprise a remote control unit (RCU), such as a host computer or a server computer, operatively coupled (e.g. via a wireless or wired network) to a remote radio head (RRH) located in the base station or eNB, for example. In an embodiment, at least some of the described processes may be performed by the RCU. In an embodiment, the execution of at least some of the described processes may be shared among the RRH and the RCU. In practice, any digital signal processing task may be performed in either the RRH or the RCU and the boundary where the responsibility is shifted between the RRH and the RCU may be selected according to implementation.

As shown in FIG. 5, a procedure according to exemplary embodiments of the present invention comprises an operation of receiving (S51) a failure report including information indicative of a radio condition during a time between a radio link failure and a successful establishment of a radio link, and an operation of performing (S52) a coverage hole analysis on the basis of said information. The coverage hole analysis may indicate coverage hole(s) with respect to downlink radio signal, or to uplink radio signal, or both.

According to further exemplary embodiments of the present invention (a variation of the procedure shown in FIG. 5), said failure report is a radio link failure report including downlink availability information indicative of availability of a downlink during the time period between said radio link failure and said successful establishment of said radio link.

According to further exemplary embodiments of the present invention (a variation of the procedure shown in FIG. 5), said downlink availability information is indicative of at least one of that said downlink was always available, that said downlink disappeared, and that said availability of said downlink was undetermined.

According to still further exemplary embodiments of the present invention (a variation of the procedure shown in FIG. 5), said downlink availability information comprises a plurality of entries, the plurality of entries indicating changes in said downlink availability during the time period between said radio link failure and said successful establishment of said radio link.

According to still further exemplary embodiments of the present invention (a variation of the procedure shown in FIG. 5), said downlink availability information comprises at least one logging entry indicative of a time and/or a location of a generation of said radio link failure report and/or of an update of said downlink availability information.

According to still further exemplary embodiments of the present invention (a variation of the procedure shown in FIG. 5), said failure report is a connection establishment failure report including a number of not reported connection establishment failures in a lapsed predetermined period of time.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
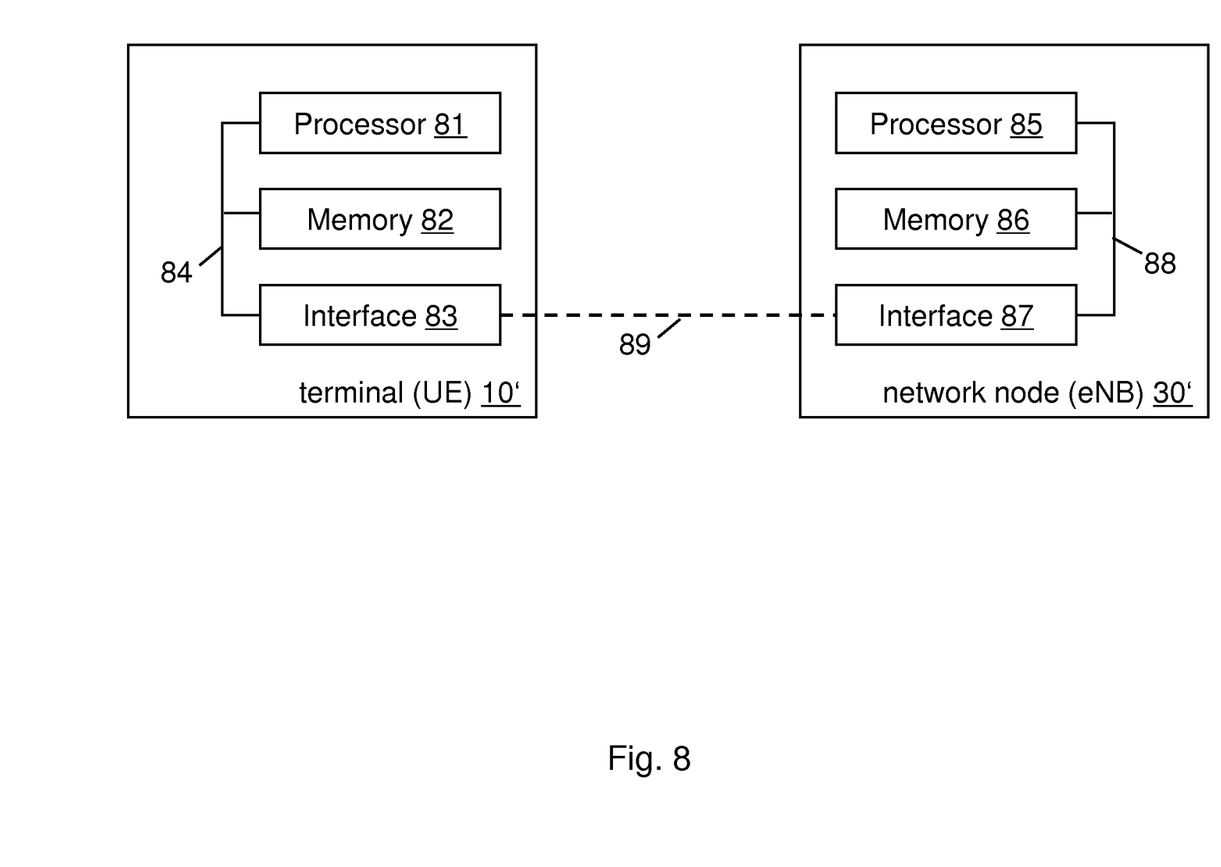
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (terminal) 10' (corresponding to the terminal 10) comprises a processor 81, a memory 82 and an interface 83, which are connected by a bus 84 or the like. Further, according to exemplary embodiments of the present invention, the apparatus (network node) 30' (corresponding to the network node 30) comprises a processor 85, a memory 86 and an interface 87, which are connected by a bus 88 or the like, and the apparatuses may be connected via link 89, respectively.

The processor 81/85 and/or the interface 83/87 may also include a modem or the like to facilitate communication over a (hardwire or wireless) link, respectively. The interface 83/87 may include a suitable transceiver coupled to one or more antennas or communication means for (hardwire or wireless) communications with the linked or connected device(s), respectively. The interface 83/87 is generally configured to communicate with at least one other apparatus, i.e. the interface thereof.

The memory 82/86 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing", means adapted to xxx, circuitry configured to xxx, and so on).

According to exemplary embodiments of the present invention, an apparatus representing the terminal 10 comprises at least one processor 81, at least one memory 82 including computer program code, and at least one interface 83 configured for communication with at least another apparatus. The processor (i.e. the at least one processor 81, with the at least one memory 82 and the computer program code) is configured to perform detecting a radio link failure (thus the apparatus comprising corresponding means for detecting), to perform producing a failure report including information indicative of a radio condition during a time period between said radio link failure and a successful establishment of a radio link (thus the apparatus comprising corresponding means for producing), to perform detecting said successful establishment of said radio link, and to perform transmitting, after detection of said successful establishment of said radio link, said failure report (thus the apparatus comprising corresponding means for transmitting).

Further, according to exemplary embodiments of the present invention, an apparatus representing the network node 30 comprises at least one processor 85, at least one memory 86 including computer program code, and at least one interface 87 configured for communication with at least another apparatus. The processor (i.e. the at least one processor 85, with the at least one memory 86 and the computer program code) is configured to perform receiving a failure report including information indicative of a radio condition during a time period between a radio link failure and a successful establishment of a radio link (thus the apparatus comprising corresponding means for receiving), and to perform performing a coverage hole analysis on the basis of said information (thus the apparatus comprising corresponding means for performing or alternatively for analyzing).

For further details regarding the operability/functionality of the individual apparatuses, reference is made to the above description in connection with any one of FIGS. 1 to 7, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for improvement of coverage hole analysis. Such measures exemplarily comprise detecting a radio link failure, producing a failure report including information indicative of a radio condition during a time period between said radio link failure and a successful establishment of a radio link, detecting said successful establishment of said radio link, and transmitting, after detection of said successful establishment of said radio link, said failure report.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP $3^{rd}$ Generation Partnership Project
CCO Coverage and Capacity Optimization
CEF Connection Establishment Failure
DL downlink
eNB evolved NodeB
HO Handover
HOF Handover Failure
LTE Long Term Evolution
MDT Minimization of Drive Tests
MRO Mobility Robustness Optimization
RLC Radio Link Control
RLF Radio Link Failure
RRC Radio Resource Control
RSRP Reference Signal Received Power
RSRQ Reference Signal Received Quality
SON Self-optimizing Networks
UE user equipment
UL uplink

The invention claimed is:

1. A method comprising:
    detecting a radio link failure,
    producing a failure report including information indicative of a radio condition during a time period between said radio link failure and a successful establishment of a new radio link, including information indicative of any attempt to re-establish a failed radio link,
    detecting said successful establishment of said new radio link, and
    transmitting, after detection of said successful establishment of said new radio link, said failure report.

2. The method according to claim 1, wherein, in relation to said producing, said method further comprises:
    generating, upon detection of said radio link failure, a radio link failure report as said failure report including downlink availability information,
    monitoring availability of a downlink during the time period between said radio link failure and said successful establishment of said new radio link, and
    updating, upon change in said availability of said downlink, said downlink availability information of said radio link failure report.

3. The method according to claim 2, wherein said downlink availability information is indicative of at least one of:
    that said downlink was always available,
    that said downlink disappeared, and
    that said availability of said downlink was undetermined.

4. The method according to claim 2, wherein, in relation to said detecting, said method further comprises:

identifying a cause of said radio link failure, and,
in relation to said generating, the method further comprises:
setting said downlink availability information to indicate that said downlink was always available, when said cause of said radio link failure is a reached maximum number of radio link control retransmissions,
setting said downlink availability information to indicate that said downlink was always available, when said cause of said radio link failure is a reached maximum number of random access transmissions,
setting said downlink availability information to indicate that said downlink disappeared, when said cause of said radio link failure is an expiry of a certain timer,
setting said downlink availability information to indicate that said downlink disappeared, when said cause of said radio link failure is any downlink failure, and
setting said downlink availability information to indicate that said downlink was always available, when said cause of said radio link failure is any uplink failure.

5. The method according to claim 4, wherein said certain timer is a Long-Term-Evolution T310 timer.

6. The method according to claim 2, wherein, in relation to said updating, said method further comprises:
setting said downlink availability information by replacing said downlink availability information, and
setting said downlink availability information by appending a further entry to said downlink availability information,
thereby forming a plurality of entries indicating changes in said downlink availability during the time period between said radio link failure and said successful establishment of said new radio link.

7. The method according to claim 2, wherein in relation to said updating, said method further comprises:
setting said downlink availability information to indicate that said availability of said downlink was undetermined, when an intensity of said monitoring in said monitoring step is reduced, and
setting said downlink availability information to indicate that said downlink disappeared, when it is discovered in said monitoring step that said downlink disappeared.

8. The method according to claim 2, wherein said radio link failure happened in a first cell, and said method further comprises:
prohibiting updating said downlink availability information, when said new radio link is established to a second cell different from said first cell.

9. The method according to claim 2, further comprising:
enabling, upon detection of said radio link failure, logging an indication of a time and/or a location of generating said radio link failure report and/or of updating said downlink availability information, and
including a result of said logging into said failure report.

10. The method according to claim 1, further comprising:
detecting a connection establishment failure, and,
in relation to said producing, said method further comprises:
generating, upon detection of said connection establishment failure, a connection establishment failure report as said failure report including a number of not reported connection establishment failures detected in a lapsed predetermined period of time.

11. A method comprising:
receiving a failure report including information indicative of a radio condition during a time period between a radio link failure and a successful establishment of a new radio link, including information indicative of any attempt to re-establish a failed radio link, and
performing a coverage hole analysis on the basis of said information.

12. The method according to claim 11, wherein said failure report is a radio link failure report including downlink availability information indicative of availability of a downlink during the time period between said radio link failure and said successful establishment of said new radio link.

13. The method according to claim 12, wherein said downlink availability information is indicative of at least one of:
that said downlink was always available,
that said downlink disappeared, and
that said availability of said downlink was undetermined.

14. The method according to claim 12, wherein said downlink availability information comprises a plurality of entries, the plurality of entries indicating changes in said downlink availability during the time period between said radio link failure and said successful establishment of said new radio link.

15. The method according to claim 12, wherein said downlink availability information comprises at least one logging entry indicative of a time and/or a location of a generation of said radio link failure report and/or of an update of said downlink availability information.

16. The method according to claim 11, wherein said failure report is a connection establishment failure report including a number of not reported connection establishment failures in a lapsed predetermined period of time.

17. A computer program product comprising a non-transitory computer-readable medium storing computer-executable computer program code which, when the program code is run on a computer, is configured to cause the computer to carry out the method according to claim 11.

18. An apparatus comprising:
at least one processor; and
at least one memory including computer program code, wherein the at least one memory and computer program code are configured, with the at least one processor, to cause the apparatus to perform operations comprising at least:
detecting a radio link failure;
producing a failure report including information indicative of a radio condition during a time period between said radio link failure and a successful establishment of a new radio link, including information indicative of any attempt to re-establish a failed radio link;
detecting said successful establishment of said new radio link, and
transmitting, after detection of said successful establishment of said new radio link, said failure report.

19. The apparatus according to claim 18, wherein the at least one memory and computer program code are further configured, with the at least one processor, to cause the apparatus to perform operations comprising at least:
generating, upon detection of said radio link failure, a radio link failure report as said failure report including downlink availability information,
monitoring availability of a downlink during the time period between said radio link failure and said successful establishment of said new radio link, and
updating, upon change in said availability of said downlink, said downlink availability information of said radio link failure report.

20. A computer program product comprising a non-transitory computer-readable medium storing computer-executable computer program code which, when the program code is run on a computer, is configured to cause the computer to carry out the method according to claim 1.

* * * * *